United States Patent [19]

Rau

[11] Patent Number: 4,477,508
[45] Date of Patent: Oct. 16, 1984

[54] EDGE TREATMENT TO PREPARE NON-CIRCULAR PLASTIC SHEETS FOR COMPRESSION STRETCHING

[75] Inventor: Robert B. Rau, Canyon Country, Calif.

[73] Assignee: PPG Industries, Inc., Pittsburgh, Pa.

[21] Appl. No.: 515,404

[22] Filed: Jul. 20, 1983

[51] Int. Cl.$^3$ .................... B32B 23/02; B28B 11/08
[52] U.S. Cl. .................... 428/192; 264/291; 264/292
[58] Field of Search ........... 264/291, 292, 293, 322, 264/2.7; 428/192

[56] References Cited

U.S. PATENT DOCUMENTS 3,632,841  1/1972  Fortin .................................... 264/1
3,668,053  6/1972  Ayres .................................. 161/118

Primary Examiner—John E. Kittle
Assistant Examiner—James J. Seidleck
Attorney, Agent, or Firm—Andrew C. Siminerio; Edward I. Mates

[57] ABSTRACT

Treating a plastic sheet blank, preferably an acrylic resin sheet, along its edge surface by applying a groove of non-uniform depth to its edge surface along a side of the blank having a length to blank thickness ratio that exceeds a critical ratio for the given blank thickness to improve the conformance of the outline of the compression stretched sheet to one similar to the outline of the thick blank prior to its compression stretching and so stretch the blank more uniformly along its orthogonal axes during the compression stretching of said blank to form said sheet.

16 Claims, 5 Drawing Figures

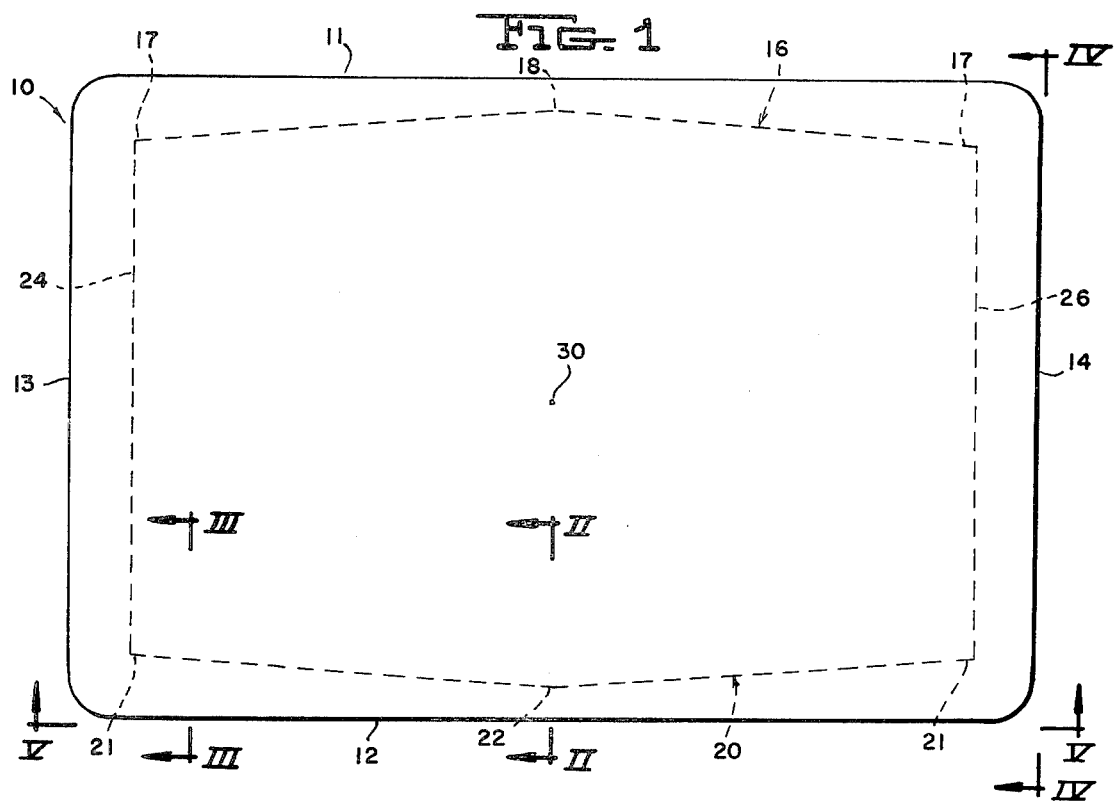
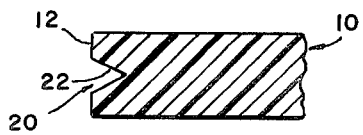
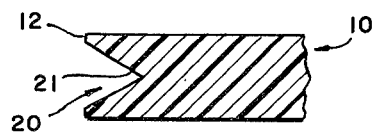
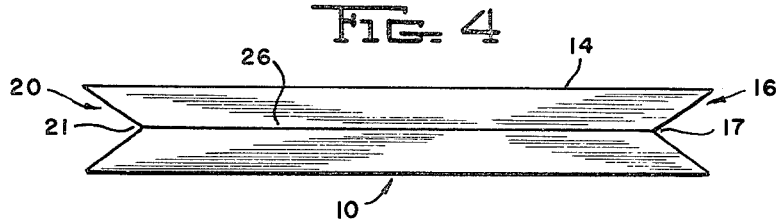
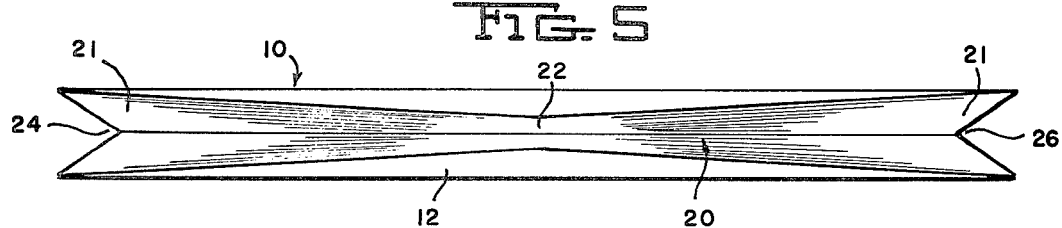

EDGE TREATMENT TO PREPARE NON-CIRCULAR PLASTIC SHEETS FOR COMPRESSION STRETCHING

BACKGROUND OF THE INVENTION

The present invention relates to the stretching of plastic sheets and, more particularly, to the stretching of plastic sheets of non-circular configuration, particularly of acrylic resin composition.

Because of its strength, formability, and light transmission characteristics, various plastic materials, such as acrylic resins, and more particularly, polymerized acrylates, preferably polymerized polymethyl methylacrylate, have a variety of uses and particularly have been used to form windows and canopies for aircraft. Manufacture of the plastic window often involves a stretching step in which an as-cast blank of plastic or acrylic material is heated and stretched to enhance its physical characteristics and/or to provide the treated acrylic sheet that results with a required curvature.

TECHNICAL PROBLEMS AND PRIOR ART PATENTS OF INTEREST

Prior to the present invention, plastic blanks, such as acrylic sheets, have been stretched in compression by compressing an as-cast acrylic plastic blank while the latter is heated to its softening temperature range, between a pair of curved or flat polished plates having a thin film of lubricant coated thereon, at a pressure cycle suitable to develop a predetermined thickness reduction rate until the desired thickness is obtained. Thereafter, the compression stretched part is cooled to a temperature below its softening temperature range, at a predetermined cooling cycle, before releasing the pressure on the stretched sheet. The use of lubricant between the acrylic blank and the polished plates causes the compression stretched sheets to have improved uniformity of optical and physical properties compared to those of sheets produced by compression stretching without using a lubricant.

The compression stretching method of U.S. Pat. No. 3,632,841 to Fortin is superior in several respects to an earlier stretching method where the blank was stretched by clamps placed around the perimeter portion of the blank as disclosed and claimed in U.S. Pat. No. Re. 24,978 to Bottoms et al. The compression stretched method involves the loss of very little material from the edges of the stretched sheet compared to the loss of all the clamped peripheral portion of the earlier method. Labor costs are decreased using the compression stretching method because one person can perform the compression stretching operation whereas it is impractical for one individual to apply a plurality of clamps to a blank while maintaining the blank at a desired uniform temperature. Rejection of finished parts due to cracking and/or warping is substantially eliminated using pressure stretching because pressure stretching makes possible closer control of the temperature throughout the extent of the acrylic blank undergoing treatment. Furthermore, thickness tolerances can be controlled much more closely with compression stretching than is possible using previously known clamp stretching methods.

The stretched acrylic sheets produced by pressure or compression stretching as depicted in the Fortin patent have superior optical properties because of the polishing provided by the polished plates and because of the close control of the temperature of the plastic or acrylic material. The compression stretched sheets also have a superior abrasion and solvent resistance compared to sheets stretched using peripheral clamps because of the compacting of the acrylic molecules due to compression stretching of the acrylic blanks.

However, as much as the Fortin patent improved the efficiency of the stretching operation over that obtained in the earlier technology, compression stretching sets up stresses in the edges of the blanks. These stresses cause cracking and subsequent loss of material around the edges of the blanks in order to eliminate the cracked material around the peripheral portion of the finished blank. Furthermore, such edge cracks can propagate throughout the compression stressed sheet, thereby resulting in a near total loss of the stretched plastic sheet.

To reduce losses from blanks stretched by the method of the Fortin patent, an invention depicted in U.S. Pat. No. 3,668,053 to Ayres was developed. In the Ayres patent, a substantially continuous groove is provided around the circumferential end surfaces of the plastic blanks prior to their compression stretching. The depth of the groove is at least about five percent and, preferably, greater than about 10 percent of the initial thickness of the acrylic blank. The groove may have a variety of configurations such as, for example, V-shaped or U-shaped configurations and the center line of the groove may be either at or offset from the center line of the circumferential end surfaces. However, it is preferable to position the groove so that its center line corresponds with the center line of the circumferential end surfaces and to employ a groove whose depth approximates half the thickness of the blank.

The grooving of acrylic blanks as described in the aforesaid Ayres patent is relatively easy to accomplish and the machining producing the groove apparently sets up no noticeable stresses in the edge of the acrylic blanks. Because of its simplicity and ease of accomplishment, the method of the Ayres invention has been extremely successful in substantially eliminating losses from the edges of compression stress plastic sheets, particularly acrylic sheets, of circular configuration. In addition, beneficial results occurred from using the Ayres patented treatment on blanks having certain configurations where the length and the width are not substantially different, such as squares and rectangles whose length dimension does not exceed the width dimension by more than a small amount, such as 10 percent.

Furthermore, blanks of a given thickness, when compression stretched, develop an outward bow when their side edge dimensions exceed a certain magnitude for blanks of said given thickness, regardless of whether the blanks are square or rectangular. For any given thickness, the degree of outward bowing along any side increases with increase of length of the side of the blank. Uniform grooving of the blank as taught in the aforesaid Ayres patent reduces the magnitude of the bow for sides up to a certain length associated with any given thickness of blank. However, grooving to a uniform depth as practised in the Ayres patent is not sufficient when the length to thickness ratio of a cast acrylic blank exceeds a certain amount, depending on blank thickness, particularly when the blank is compression stretched to one-third of its original as-cast thickness. For example, the ratio cannot exceed length to thickness ratios of approximately 60 for blanks having a nominal thickness of ⅜ inch (0.95 centimeters), or approximately 30 for blanks having a nominal thickness of 1.5 inch (3.81 centimeters), or approximately 15 for blanks having a nominal thickness of 3 inches (7.62 centimeters) without developing excessive bow when the blanks are grooved to a uniform depth.

When a sheet formed from a blank by compression stretching has an outline shape that is dissimilar from the outline shape of the original blank, such as sheets having outwardly bowed sides, for example, the degree of dissimilarity of outline shapes indicates the non-uniformity of stretching in different directions parallel to the major surfaces of the blank or sheet. The greater the outward bowing observed in the compression stretched sheet, the greater is the non-uniformity of stretching along orthogonal axes in planes parallel to the major surfaces of the sheet. Non-uniform stretching indicates non-uniform structural properties in the sheet, characterized by a tendency of the sheet to craze and/or to propagate cracks. Hence, any change in processing that reduces nonuniform stretching would be beneficial.

In addition, for plastic sheets whose length and width differ considerably or whose outline differs greatly from that of a square or a circular configuration, the longer dimension of the blank tends to bow outward when the blank is stretched by compression stretching after its edge has been grooved in the manner depicted by the Ayres patent. The outward bowing usually increases the amount of excess plastic that must be trimmed to produce a transparent sheet of requisite outline configuration from the compression stretched sheet in cases where the outline of the ultimate window is irregular.

Deviations from the desired ultimate outline shape of the pressure stretched sheet can be corrected by trimming any excess. However, the loss of material that must be removed is an expense that would be desirable for the plastic compression stretching art to minimize if not eliminate completely.

DESCRIPTION OF THE PRESENT INVENTION

According to the present invention, compression stretching of sheets of plastic such as acrylic resinous sheets produces a finished sheet that has a shape essentially similar to the original shape. The present invention accomplishes this end by varying the depth of groove along the longer side edges of rectangular sheets by reducing the groove depth from the corners of the blank to the mid-points of the longer edges prior to the compression stretching operation. More generally, if the distance from the geometric center of the blank of non-circular outline to be compression stretched to the edge is determined, the disfiguration of the outline from the blank to be compression stretched to the stretched sheet is minimized when the groove depth at the portion of the edge surface at a relatively long distance from the geometric center of the blank is a point of relatively deep grooving and the depth of grooving is reduced at least along the longest edges of the blank as the distance from the geometric center of the blank to the other portions of the edge surface diminishes. While some additional benefits may also be obtained if the depth of grooving along the shorter sides is also modified along their length by changing the depth of groove in conformance with the distance from the geometric center to the portion of the edge at which the groove is applied, for practical purposes for most commercial windows of essentially rectangular configuration presently produced, the short sides can be grooved with a groove of uniform depth whereas the longer sides are grooved with grooves that reduce in depth according to the reduction in distance from the geometric center of the blank to the portion of the edge of the blank that is being grooved.

In addition, larger blanks of any non-circular configuration including square configurations of any given thickness, are compression stretched into sheets having vastly improved outline configurations more nearly similar to the original outline of the original blank when the depth of groove is modified according to the teachings of the present invention to have a non-uniform depth. Stretching of blanks grooved according to the teachings of the present invention is more nearly uniform in any direction parallel to the major surfaces of the resulting sheet, thereby reducing the tendency of the compression stretched sheet to craze and/or to propagate cracks than is the case with sheets produced by compression stretching of blanks prepared by prior art edge preparation techniques or in the absence of any edge preparation.

The benefits of the present invention will be understood better in the light of a description of a preferred embodiment that follows.

DESCRIPTION OF THE DRAWINGS

In the drawings that form part of a description of an illustrative embodiment of the present invention;

FIG. 1 is a plan view of a substantially rectangular blank depicting in phantom the relative depth of the edge groove along the perimeter of a blank preparatory to compression stretching the blank to form a sheet of essentially similar outline;

FIG. 2 is a fragmentary enlarged sectional view taken along the line II—II of FIG. 1;

FIG. 3 is a fragmentary enlarged sectional view taken along the line III—III of FIG. 1;

FIG. 4 is an end elevation taken along the line IV—IV of FIG. 1 looking at a short edge of the rectangular blank that has been grooved around its perimeter according to the teachings of the present invention; and FIG. 5 is a view taken along the line V—V of FIG. 1, showing the arrangement of the groove along the longer edge of the blank.

DESCRIPTION OF PREFERRED EMBODIMENTS

With reference to the drawings, FIG. 1 shows in plan view a sheet of plastic 10 of substantially rectangular shape after the latter has been prepared for compression stretching by the edge grooving technique of the present invention. The blank has a pair of longitudinal sides 11 and 12 interconnected by short sides 13 and 14. An elongated groove 16 having its deepest portions 17 located at the corner portions of the blank and a shallowest portion 18 located generally centrally of the blank length is provided midway through the thickness of the blank along the edge surface of the longitudinal side 11. A longitudinal side groove 20 is provided along the length of the edge surface 12 opposite longitudinal edge surface 11. The longitudinal side groove 20 is provided with deepest portions 21 at the extremities of the groove 20 at each corner portion of the rectangular blank and a shallowest portion 22 located approximately midway between the corners defined in part by the longitudinal side 12.

The rectangular blank comprises a transverse groove 24 applied approximately midway through the thickness of the edge surface of the side edge 13 and an additional transverse groove 26 applied approximately midway through the thickness of the edge surface of side edge 14 along its length. For practical purposes and ease of application, the depth of grooves 24 and 26 may be uniform along their length, although it may be preferred to vary the depth of grooves 24 and 26 to minima where the groove 24 or 26 is closest to the geometric center 30 of the plastic blank to be press stretched. The difference in distance from the geometric center 30 to the short sides 13 and 14 does not vary very much along the length of the short sides. Therefore, the depths of the transverse grooves 24 and 26 may be essentially uniform along their length. However, along the long sides 11 and 12, the distance from any point along the long side 11 or 12 to the geometric center 30 varies considerably by comparison with the corresponding distances to the geometric center 30 along the length of the short sides 13 and 14. Consequently, according to the present invention, it has been found necessary to modify the depth of the grooves 16 and 20 applied along the long sides 11 and 12 of the essentially rectangular blank so as to have the grooves be maximum depth near the corners of the blank where the distances to the geometric center are a maximum and reducing in depth toward the central portions of the long sides 11 and 12.

EXAMPLE 1

The following experiment demonstrated the benefits of the present invention. Ten as-cast blanks of polymethyl methacrylic resin 1.5 inch (3.8 centimeters) thick, 48 inches (122 centimeters) long and 33 inches (84 centimeters) wide were grooved midway of their thickness to a depth of ¾ inch (1.9 centimeters) entirely around their edge surface using a cutting wedge defining a 90 degree angle at its cutting end. The grooved blanks were treated on their major surfaces with a Teflon ® colloidal dispersion manufactured by Axel Plastics Research Lab, Inc. and sold under the trademark MOLD-WIZ ® F-57. The blanks were sandwiched individually between a pair of tempered glass sheets coated with MOLD-WIZ ® F-57 dispersion and heated isothermally to approximately 310° F. (155° C.).

Each of said blanks was then compressed at a thickness reduction rate of about 500 mils (12.7 millimeters) per minute to produce stretched acrylic sheets having an average length ranging from 78 inches at their ends to 80 inches (203 centimeters) at their mid-points, with an average outward bow of 1 inch (2.5 centimeters). The resulting sheets had an average width ranging from ends to midpoints from 58 to 64 inches (147 to 163 centimeters) with an average outward bow of 3 inches (7.6 centimeters). The sheets were ½ inch (1.27 centimeters) thick.

An average outward bow of 3 inches (7.6 centimeters) along the widths indicated a very severe imbalance of transverse stretching and an average outward bow of one inch (2.5 centimeters) along the lengths, while more acceptable than the 3 inch bow along the widths, still left something to be desired in the uniformity of longitudinal stretching.

Ten additional blanks of the same dimensions as the first set of ten blanks were provided with grooves ¾ inch (1.9 centimeters) deep along the entire length of the widths and with grooves ranging in depth from ¾ inch (1.9 centimers) at the ends of the longer sides to ¼ inch (0.6 centimeter) at their mid-points. The additional blanks were otherwise treated in the same manner as described previously for the first ten blanks.

After compression stretching, the additional ten sheets had a thickness of ½ inch (1.27 centimeters). However, the additional ten sheets after compression stretching had an average length of 82 inches (208 centimeters) between corresponding ends and between corresponding midpoints, while the average width of the ten additional sheets varied from 56 inches (142 centimeters) between the opposing corresponding ends to 58 inches (147 centimeters) between the opposing corresponding midpoints. There was no bowing in the longitudinal direction and an outward bow of only one inch (2.5 centimeters) in the width direction. The absence of outward bow in the longitudinal direction indicates an essentially uniform longitudinal stretching of the resulting sheet from side to side thereof. The reduction of average outward bow in the transverse direction from 3 inches (7.6 centimeters) using prior art edge preparation for compression stretching to one inch (2.5 centimeters) using the present invention indicates a substantial improvement in uniformity of transverse stretching in the sheet.

Another method used to analyze the test results involves comparing the degree of longitudinal stretching to the degree of transverse stretching when the compression stretching was performed using the prior art technique of the Ayres patent with that of the present invention. The following table indicates the improvement in uniformity of stretching that resulted in modifying the compression stretching technique.

TABLE I

| Comparison Of Longitudinal And Transverse Stretching | | |
|---|---|---|
| | Average of Sheets Stretched with Prior Art Edge Preparation | Average of Sheets Stretched Using Present Invention To Prepare Edges |
| Average longitudinal Stretching | 64.6% | 70.8% |
| Average Transverse Stretching | 84.8% | 72.7% |
| Average % Difference | 20.2% | 1.9% |

The data enumerated indicate that the control of depth of grooves has improved the uniformity of stretch from an average variation of more than 20% between average longitudinal stretch and average transverse stretch to less than 2%. This more than 10-fold improvement can be further improved by fine tuning the variation in depth of groove along the longer sides to a different minimum depth of groove at their midpoints or by introducing a variation in depth of groove along the shorter sides as well.

In fine tuning experiments, it has been determined that it is possible to obtain inward bow as well as outward bow depending on variation of groove depth along the length of the long sides and/or the short sides of the sheet resulting from compression stretching of the blank.

The present invention has discovered that a need exists for varying the depth of groove applied along an edge surface of a plastic blank of non-circular outline along any side of the blank whose length to thickness ratio exceeds a side length to blank thickness ratio characteristic of the blank thickness and that decreases with greater blank thickness. The following table shows critical ratios at which blanks of different exemplary thicknesses tend to develop outward bow if sides having side length to blank thickness ratios exceed the critical ratio indicated for the respective thicknesses.

TABLE II

Side Length To Thickness Ratios At Which Blanks Of Different Thickness Require Edge Grooves Of Non-Uniform Depth

| Blank Thickness | Ratio of Side Length/ Blank Thickness |
| --- | --- |
| ⅜ inch (0.95 centimeters) | 60 |
| 1.5 inches (3.81 centimeters) | 30 |
| 3 inches (7.62 centimeters) | 15 |

The groove is applied by providing relative movement between a pointed cutting tool having a cutting surface angled to approximately 90 degrees (although this specific number is not limiting the present invention since sharper or blunter cutting surface angles can be used over a relatively wide range) and the approximate mid-plane of the edge surface of the blank. As the blank rotates past a cutting station or as a cutting tool moves around the end edges of the blank, cam means can be applied to move the cutting edge inwardly or outward relative to the edge surface to provide a varying depth of bend according to any pattern of depth of groove required.

The grooves of non-uniform depth may have a maximum depth ranging from 10 percent to 100 percent of the thickness of the blank. The depth of such grooves may be reduced to a minimum depth that ranges from one-quarter to one-half of the maximum depth at the shallowest portion of the groove. Non-uniform grooves that have minimum depths approximating one-third of the maximum depth have produced successful results in compression stretching rectangular blanks 50 inches (127 centimeters) long, 36 inches (91 centimeters) wide and one inch (2.5 centimeters) thick, where typical grooves along the long sides were one-half inch (1.3 centimeters) deep at the corners, gradually reducing in depth to one-sixth inch (0.4 centimeters).

While the examples recited previously include grooves whose depths vary gradually from ends to mid-points of sides over a certain length that is critical for any given thickness, the variation in depth of groove along the length of the side need not be linear, depending on the uniformity of application of the low friction coatings applied to the major surfaces of the blank and of the compression stretching molds.

While the grooves shown in the specification appear to have right angle cross-sections, it is understood that other groove cross-sectional configurations mentioned in the Ayres patent, the disclosure of which is incorporated herein by reference, are also suitable for use in grooves of non-uniform depth as taught by the present invention.

The corners of the essentially rectangular blank 10 are shown as rounded. Rounding the corners provides a more gradual change in distance from the geometric center to adjacent edge portions of the blank in the vicinity of each corner. Local deviations in resulting stretch at the corners are reduced considerably when a blank is treated at its corners to convert sharp angled corners to rounded corners. For a blank 50 inches (127 centimeters) long and 36 inches (91 centimeters) wide, a radius of 3 inches (7.6 centimeters) has been found to be acceptable.

The form of the invention shown and described in this disclosure represents an illustrative preferred embodiment and certain modifications thereof. It is understood that many changes may be made without departing from the gist of the invention as defined in the claimed subject matter that follows.

What is claimed is:

1. A plastic sheet blank of non-circular outline having a geometric center, an upper major surface, a lower major surface and an edge surface interconnecting said major surfaces around the peripheral portion of said blank and having different portions spaced different distances from its geometric center, characterized by a circumferentially extending groove in said edge surface having a lesser depth of groove in its portion spaced a relatively short distance from said geometric center and a greater depth of groove in its portion spaced a relatively long distance from said geometric center.

2. A plastic sheet blank as in claim 1 of essentially rectangular outline comprising a pair of longer side edges and a pair of shorter end edges defining said edge surface, further characterized by said groove having a greater depth near the ends of said longer side edges and a lesser depth near the mid-point of said longer side edges.

3. A plastic sheet blank of essentially rectangular outline as in claim 2, further characterized by said groove having an essentially uniform depth of groove along each of said shorter end edges.

4. A plastic sheet blank as in claim 1, further characterized by said circumferentially extending groove being located approximately midway between said upper major surface and said lower major surface.

5. A plastic sheet blank as in claim 1, further characterized by said groove being substantially coextensive with said edge surface.

6. A plastic sheet blank as in claim 1, composed of acrylic resin.

7. A plastic sheet blank of non-circular outline as in claim 1, having a side provided with an edge surface having a groove of non-uniform depth, further characterized by said side having a length to blank thickness ratio that exceeds a critical ratio of 15 when the blank has a thickness of 3 inches (7.62 centimeters), that exceeds a critical ratio of 30 when the blank has a thickness of 1.5 inches (3.81 centimeters), or that exceeds a critical ratio of 60 when the blank has a thickness of ⅜ inch (0.95 centimeter).

8. A plastic sheet blank of non-circular outline as in claim 1, further characterized by rounded corners.

9. A method of preparing a plastic sheet of non-circular outline having a geometric center, an upper major surface, a lower major surface and an edge surface interconnecting said major surfaces around the peripheral portion of the blank and having different portions spaced different distances from its geometric center for press stretching, comprising applying a groove extending circumferentially of said sheet along said edge surface, characterized by applying said groove in such a manner that it is relatively deep in the portion of said groove spaced a relatively greater distance from said geometrical center and it is more shallow in the portion of said groove spaced a relatively shorter distance from said geometrical center.

10. A method as in claim 9 for preparing a plastic sheet blank of essentially rectangular outline comprising a pair of longer side edges and a pair of shorter end edges defining said edge surface, further characterized by applying said groove in such a manner that it has a greater depth near the ends of said longer side edges and a lesser depth near the midpoint of said longer side edges.

11. A method as in claim 10, further characterized by applying said groove to have an essentially uniform depth along each of said shorter end edges.

12. A method as in claim 9, further characterized by applying said circumferentially extending side grooves approximately midway between said upper major surface and said lower major surface.

13. A method as in claim 9, further characterized by applying said groove to be substantially coextensive with said edge surface.

14. A method as in claim 9, further characterized by grooving a plastic sheet composed of acylic resin.

15. A method as in claim 9, wherein said sheet has a side having a ratio of side length to blank thickness that exceeds a critical ratio of 15 when said blank thickness is 3 inches (7.62 centimeters), that exceeds a critical ratio of 30 when said blank thickness is 1.5 inches (3.81 centimeters), or that exceeds a critical ratio of 60 when said blank thickness is ⅜ inches (0.95 centimeter), further characterized by applying said groove of non-uniform depth to any of said sides whose said ratio exceeds said critical ratio; for any said given blank thickness.

16. A method as in claim 9, further characterized by rounding the corners of said blank to avoid any sharp corners.

* * * * *

UNITED STATES PATENT AND TRADEMARK OFFICE
CERTIFICATE OF CORRECTION

PATENT NO. : 4,477,508

DATED : October 16, 1984

INVENTOR(S) : Robert B. Rau

It is certified that error appears in the above-identified patent and that said Letters Patent is hereby corrected as shown below:

Column 10, line 2, "acylic" should be --acrylic--.

Signed and Sealed this

Ninth Day of July 1985

[SEAL]

*Attest:*

DONALD J. QUIGG

*Attesting Officer*     *Acting Commissioner of Patents and Trademarks*